(12) United States Patent
Schoenfeld

(10) Patent No.: US 6,360,593 B1
(45) Date of Patent: Mar. 26, 2002

(54) METHOD AND APPARATUS FOR REDUCING VIBRATIONS TRANSMITTED TO A VEHICLE FROM A WHEEL UNIT

(75) Inventor: Harald Schoenfeld, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 0 days.

(21) Appl. No.: 09/516,398

(22) Filed: Mar. 1, 2000

(30) Foreign Application Priority Data

Mar. 3, 1999 (DE) .......................................... 199 09 162

(51) Int. Cl.⁷ .......................... E01C 23/00; G01N 19/02
(52) U.S. Cl. ................................................. 73/146; 73/8
(58) Field of Search .............................. 73/146, 146.2, 73/146.3, 146.4, 146.5, 146.8, 91, 865.3, 866, 8; 267/64.11, 64.13, 64.16, 70

(56) References Cited

U.S. PATENT DOCUMENTS

| | | | |
|---|---|---|---|
| 2,920,481 A | | 1/1960 | Hulswit, Jr. et al. |
| 3,575,047 A | | 4/1971 | Hunter et al. |
| 3,589,182 A | * | 6/1971 | Burgett .......................... 73/146 |
| 4,244,416 A | | 1/1981 | Newton |
| 4,366,707 A | | 1/1983 | Jarschel |
| 4,594,878 A | * | 6/1986 | Abe et al. .......................... 73/9 |
| 4,655,080 A | | 4/1987 | Ongaro |
| 5,003,819 A | | 4/1991 | Koopmann |
| 5,014,551 A | | 5/1991 | Beebe et al. |
| 5,639,962 A | | 6/1997 | Maloney |
| 6,070,705 A | * | 6/2000 | Hinterlechner ............ 192/12 R |

FOREIGN PATENT DOCUMENTS

| | | |
|---|---|---|
| DE | 1573542 | 5/1970 |
| DE | 2401279 | 8/1974 |
| DE | 3010315 | 9/1981 |
| DE | 4115726 | 11/1991 |
| DE | 4143543 | 11/1991 |
| DE | 4220276 | 2/1993 |
| EP | 0671621 | 9/1995 |
| WO | WO88/03866 | 6/1988 |
| WO | WO97/28431 | 8/1997 |

* cited by examiner

Primary Examiner—Benjamin R. Fuller
Assistant Examiner—Abdullahi Aw-Musse
(74) Attorney, Agent, or Firm—W. F. Fasse; W. G. Fasse

(57) ABSTRACT

Vibrations generated by the wheel units of a vehicle are reduced by a low pulsating operation that optimally simulates actual vehicle operating conditions. For this purpose the mass moment of inertia of the wheel unit and of rotating components such as the hub and the brake disc are taken into account. The wheel unit is rotatably mounted on a balancing spindle (2) in a measuring apparatus to determine the mass and angular location of balancing weights (31). The vibrations are measured at a speed that corresponds to a typical travel speed of a vehicle. A loading mechanism including a roller shoe (20) applies a force to the tire tread surface through a spring damping (14, 15) to optimally simulate the conditions of a roadway. The roller shoe (20) has rollers (13) with sections of larger and smaller diameters so that neighboring rollers intermesh. The combined masses of the rollers, as reduced to the roller radius $d_w$, corresponds to the rotational mass of the vehicle wheel as reduced to the tread radius ($d_R$). It is also possible to disengage the contact force from the tread surface for dynamically balancing the wheel unit under load-free conditions. Thus, wheel-balancing steps under loaded and load free conditions can be done on one machine.

30 Claims, 3 Drawing Sheets

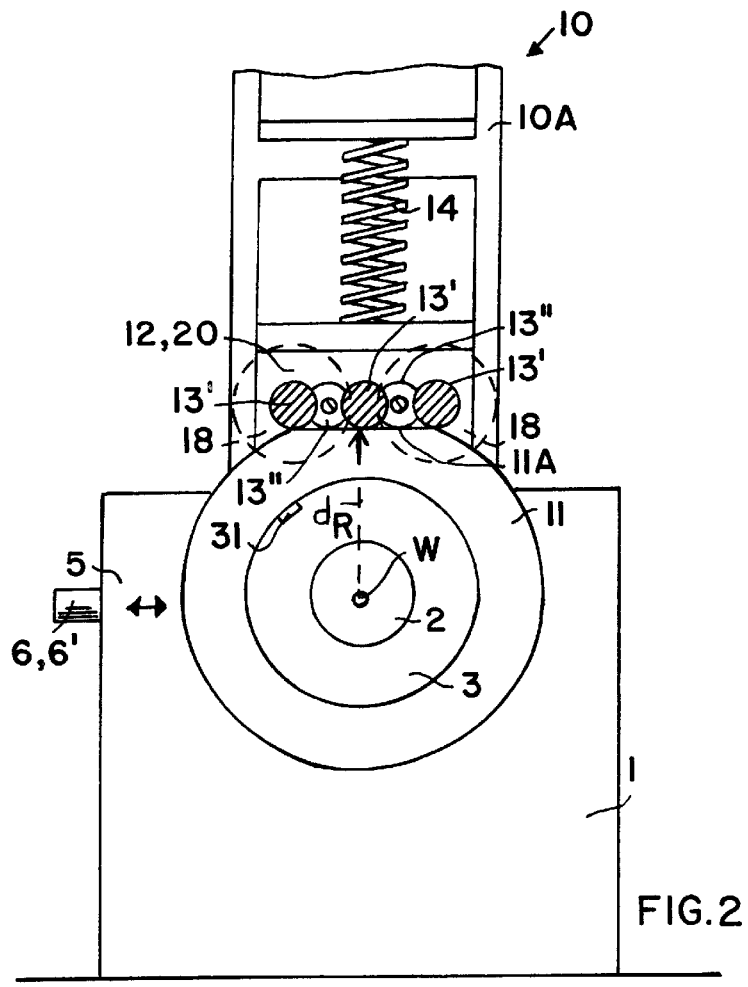
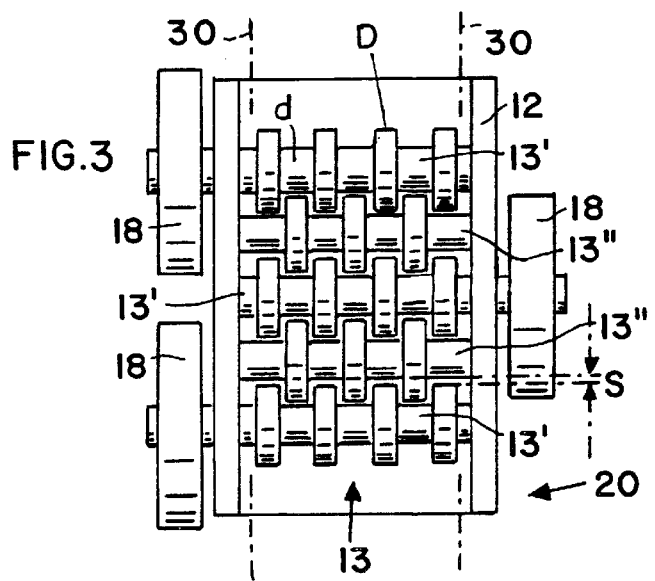
FIG.2
FIG.3

METHOD AND APPARATUS FOR REDUCING VIBRATIONS TRANSMITTED TO A VEHICLE FROM A WHEEL UNIT

PRIORITY CLAIM

This application is based on and claims the priority under 35 U.S.C. §119 of German Patent Application 199 09 162.5, filed on Mar. 3, 1999, the entire disclosure of which is incorporated herein by reference.

FIELD OF THE INVENTION

The invention relates to a method for reducing vibrations transmitted by a wheel unit to a vehicle to which the wheel unit is mounted. The invention further relates to an apparatus for reducing such vibrations.

BACKGROUND INFORMATION

The wheel units of a vehicle are guided by guide arms and support the sprung mass of the vehicle by means of spring or damping devices. The term "wheel unit" as used here refers to a tire mounted on a wheel rim. Irregularities in a tire, such as localized variations in the tire elasticity, dimensional deviations, unbalances and other irregularities in the wheel rim and/or tire characteristics of the wheel unit can cause undesirable vibrations that are transmitted to other components of the vehicle. Vibrations that are transmitted to the steering wheel of a vehicle are particularly noticeable and disturbing.

Various efforts have been made to reduce these vibrations to a tolerable level or to eliminate them completely. Today, the wheel unit is generally dynamically balanced on conventional balancing machines or is balanced after it has been assembled on a vehicle.

Wheel unit balancing can be supplemented in that, preceding a balancing operation, geometrical characteristics and/or material properties of the wheel rim and/or the tire unit are optimized before dynamically balancing that wheel unit. Such optimization takes into consideration that the wheel rim, the tire and the wheel unit may show radial and transverse run-outs and that the spring characteristics of the tire can vary locally.

U.S. Pat. No. 4,244,416 (Newton) describes a tire buffing machine and a method for applying a load to a tire that is mounted on a wheel rim to determine a radial run-out. Rubber is then ground from places on the tire that have been found to show a run-out due to excess rubber. The wheel unit is then balanced on a dynamic balancing machine.

German Patent DE 41 43 543 C2 teaches a method for reducing operational vibration characteristics of wheel units. A wheel unit is mounted on a wheel balancing machine, the radial run-out of the wheel rim is measured and determined under a constant load applied to the wheel unit while rotating at approximately 60 r.p.m. The constant load is applied by pressing a loading drum against the tire of the wheel unit. It is then determined whether rotating the tire around the periphery of the wheel rim will bring improvement or whether it is necessary to grind the periphery of the tire for obtaining improvements. The appropriate measures are then carried out and the wheel unit is then balanced.

Both of these methods include the use of several devices, which are often a source of inaccuracies. The grinding process is time-consuming, costly and environmentally undesirable because rubber dust is produced. Besides, the prior art leaves room for improvement, especially with regard to simulating actual vehicle characteristics or vehicle operating conditions.

OBJECTS OF THE INVENTION

In view of the above it is the aim of the invention to achieve the following objects singly or in combination:

- to provide a method for reducing vibrations that are caused by a wheel unit;
- to provide a method that takes optimally into account actual vehicle operating conditions by simulating these conditions on a combined balancing and loading machine;
- to allocate different degrees of influence to various parameters that together constitute the actual vehicle operating conditions for determining the required balancing weights;
- to provide an apparatus for applying to a wheel unit load conditions which closely resemble the actual vehicle operating conditions;
- to provide an apparatus that will provide balance information for a wheel unit with regard to both transverse and radial non-uniformities or unbalances in the wheel unit geometry or in the material of the wheel unit; and
- to combine a balancing machine with a wheel loading machine so that the balancing information can be obtained under simulated operating conditions.

SUMMARY OF THE INVENTION

The above objects have been achieved by the method according to the invention which is characterized by the following steps:

a) mounting a wheel unit including a tire on a wheel rim to a wheel mounting of a measuring unit for rotation;

b) rotating said wheel unit about a wheel unit axis (W) at an r.p.m. within an actual vehicle operation r.p.m. range;

c) simulating actual vehicle operating conditions by loading said rotating wheel unit through a loading device forming a shock absorber having a spring damping characteristic corresponding substantially to a spring damping characteristic of an actual vehicle wheel suspension;

d) measuring vibration values and respective angular values while said wheel unit is rotating under said loading; and e) processing said vibration values and said angular values for providing unbalance information for a compensating operation.

The present method is performed by an apparatus according to the invention comprising:

a) a balancing machine 1 including a wheel mounting for said vehicle wheel unit 3, said wheel mounting having a rotation axis W, b) a drive for rotating said vehicle wheel unit, c) a loading device 10 in the form of a shock absorber for applying a load to said vehicle wheel unit, said shock absorber of said loading service comprising spring and damping elements 14, 15 for applying the load against a tread of said tire, said spring and damping elements 14, 15 having a spring damping characteristic corresponding substantially to a spring damping characteristic of an actual vehicle wheel suspension for simulating actual vehicle operating conditions, and d) sensors 6, 7 for measuring vibration values and respective angular values to obtain compensating information.

For the first time, according to the invention, practically all factors that significantly influence the vibrational behavior of a wheel unit during vehicle operation are taken into account for reducing vibrations in a single balancing set-up in a single apparatus. The invention is based on the recognition that a number of parameters must be taken into account for a proper balancing operation. The parameters include for example: the influence of the wheel suspension on vibrations, the translational inertia masses, the rotational inertial masses, and the deformation of the tire at its tread contact area with the road. All these parameters exert a significant influence on the quality of the reduction of the vibration that can be achieved. On the one hand, depending on the circumstances of the individual case, such as a particular type of wheel or the wheel suspension in the vehicle, varying degrees of significance can be assigned to these parameters for achieving the desired vibration reduction. On the other hand the same significance or weight may be accorded to the parameters. For example, variations in the stiffness of the tire can cause vibrations of magnitudes that correspond to the vibrations caused by wheel unbalances determined in a load-free dynamic balancing. By including, for example, the inertia mass and rotational inertia mass of the vehicle wheel unit in the measurements for the balancing, the variations in stiffness and the influence of the mass moment of inertia of the vehicle wheel unit are also taken into consideration. Both of these parameters are causes for vibrations and are superposed on each other. Furthermore, wheel conditions under which vibrations should not be noticeable are taken into account by including the inertia mass of the wheel unit and of the unsprung wheel assembly components such as the hub, brake, and the wheel carrier or mounting, the spring rate and the damping of the wheel suspension, in the balancing measurements. Such measurements are preferably taken at a wheel speed that corresponds to the vehicle speed at which critical vibrations occur. However, vibration measurements can be taken at various speeds or in a range of speeds, as required for a vibration reduction by an effective balancing.

The invention combines the following features. A wheel unit is mounted on a balancing spindle that in turn is mounted on two oscillating bridges in a measuring unit. Two sensors detect the vibrations generated by the wheel unit to be balanced. An angular position sensor detects the angular position of the wheel unit where unbalances are present. The measured signals are processed in an evaluating unit. A wheel unit loading mechanism is mounted on the measuring unit and is so constructed that a controllable force or pressure is applied to the wheel unit. The size of the force is selected for optimally simulating the conditions between the tread contact area of a vehicle wheel tire and a road surface. The mounting of the loading mechanism is constructed to simulate the characteristics of the vehicle wheel suspension.

For achieving such simulation, the inertia mass of the loading mechanism corresponds to the unsprung mass of the wheel unit including the unsprung components such as the hub, the brake, and the wheel carrier. In order to simulate the actual rotational relationships in the balancing operation, the loading mechanism is provided with rotatable load elements in the form of rollers. According to the invention, the reduced mass $m1_{dw}$ of the rollers corresponds substantially to the reduced mass $m2_{dR}$ of the rotating parts of the vehicle wheel unit that are effective at the tread radius, thus: $m1_{dw}=m2_{dR}$ as will be explained in more detail below.

In an advantageous embodiment, the contact force of the loading mechanism that simulates the actual vehicle operating conditions are controlled in open loop manner for simulation of various conditions that occur during vehicle travel.

The contact force can be reduced to zero by disengaging the loading device specifically the loading rollers from the tire tread, whereby the present apparatus can be used for conventional load-free dynamic wheel balancing.

In a particularly advantageous embodiment, the rollers of the loading mechanism are mounted in a roller shoe. The axes of rotation of the rollers run either parallel to or at an angle to the axis of rotation of the wheel unit. Further by rotating the roller shoe about an axis formed by the direction of loading, conditions can be simulated on the tire that are typical when the vehicle wheel deviates from straight-ahead travel. In another embodiment the roller shoe is tiltable for see-sawing about a journal axis extending horizontally through a vertical load application axis and in a plane passing at a right angle through the rotation axis of the wheel unit, whereby road curve conditions can also be simulated.

In another advantageous embodiment the rollers have roller sections of larger and smaller diameters. The sections of larger and smaller diameters on different neighboring rollers are offset or axially displaced so that a section of larger diameter of one roller extends radially into the space provided by a smaller diameter roller section between two larger roller sections on a neighboring roller. This intermeshing arrangement of the rollers makes the roller shoe compact and allows the rollers to be placed in relatively close proximity to each other, whereby the roller sections form a loading surface that contacts the tire tread at many closely spaced points within a single plane thereby optimally simulating a road surface. This arrangement has the further advantage that commercially available ball bearings or roller bearings can be used for forming the roller sections as rotatable roller rings. Particularly the roller sections of larger diameter can be formed as antifriction bearings, the outer races of which form the tire contacting load application surface.

Several rollers can be coupled together with regard to their rotational characteristics, whereby it becomes simpler to precisely determine the reduced rotational mass of the roller shoe.

After the balancing information has been obtained through an evaluating and display unit forming part of the balancing machine, it is preferred to rotate the wheel unit into a position in which a balancing weight can be conveniently attached to the wheel unit by the operator. Such a rotation of less than a full turn is possible by the wheel drive of the balancing machine. However, it is preferred to use a separate drive for this purpose. Such a separate drive includes a motor and at least one drive roller contacting the tire for turning the wheel unit to a specific angular position. A separate drive for this purpose allows for a simpler, more precise positioning of the wheel unit for the attachment of at least one balancing weight.

BRIEF DESCRIPTION OF THE DRAWINGS

In order that the invention may be clearly understood, it will now be described in connection with example embodiments, with reference to the accompanying drawings, wherein:

FIG. 2 illustrates partially in section along section line A—A of FIG. 1 details of the load application device;

FIG. 3 is a plan view of the present roller shoe as viewed in the direction of the arrow III in FIG. 1.

DETAILED DESCRIPTION OF PREFERRED EXAMPLE EMBODIMENTS AND OF THE BEST MODE OF THE INVENTION

Figure 1:
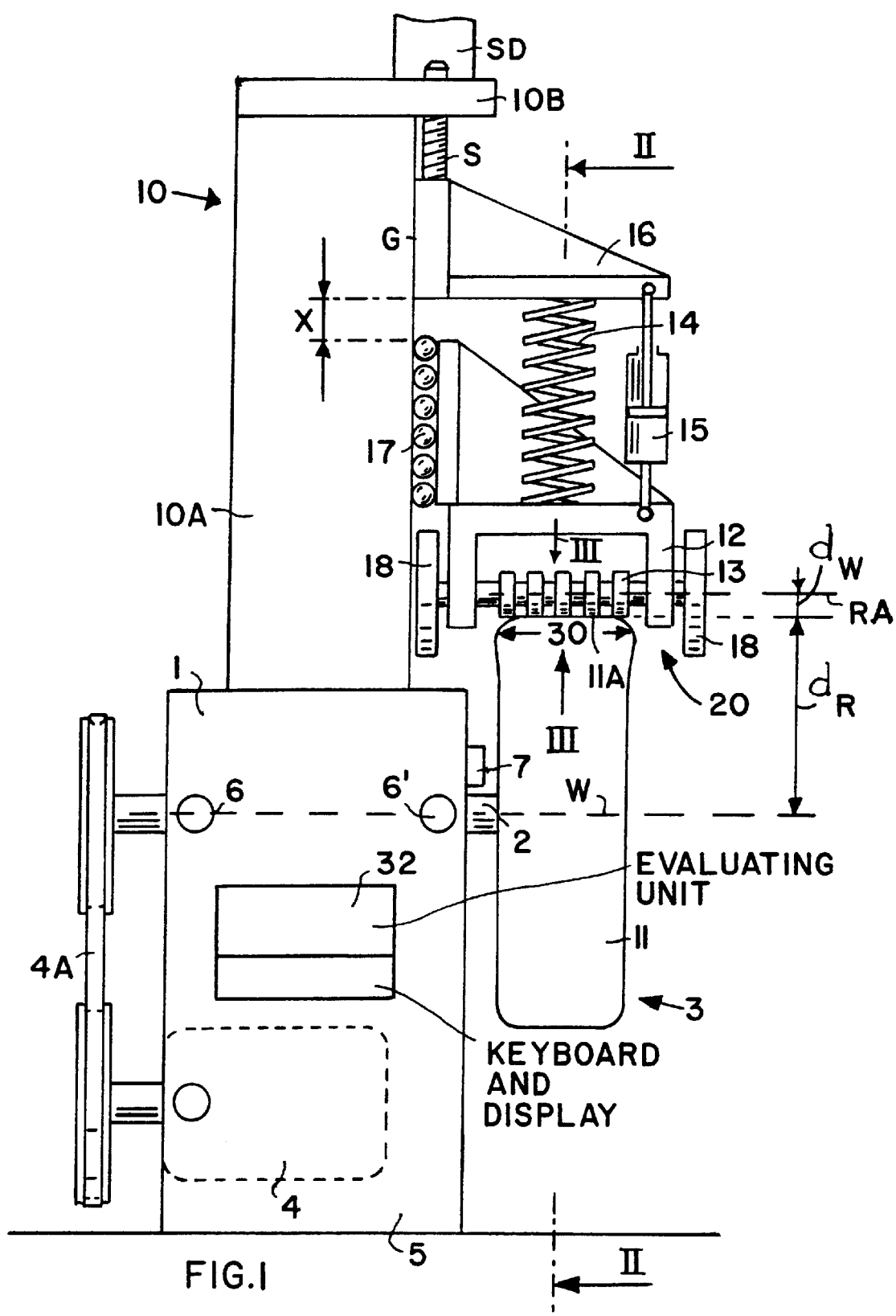
FIG. 1 is a side view of a first embodiment of the apparatus according to the invention combining a balancing machine with a load application device including a roller shoe, for simulating actual vehicle operating conditions on a straight road.

FIG. 1 shows an apparatus for simulating loads that optimally resemble actual vehicle operating conditions for reducing vibrations caused by a wheel unit. The apparatus comprises a measuring unit or so-called balancing machine 1 for determining vibrations of a wheel unit 3. The measuring unit 1 comprises a rotatable balancing spindle 2 conventionally mounted on two oscillating bridges not shown. The oscillating bridges are supported on spring elements mounted in a machine frame 5. A drive motor 4 is used for rotating the balancing spindle 2, for example, by means of a belt drive 4A. The wheel unit 3 is mounted on the balancing spindle 2 for rotation with the spindle 2. As the wheel unit 3 rotates, the balancing spindle 2 oscillates and respective vibrations are transmitted by the balancing spindle 2 to the oscillating bridges. Sensors 6, 6' are arranged in the measuring unit 1 to detect vibrations of the two oscillating bridges relative to a horizontal plane extending through a spindle axis W of the balancing spindle 2. This horizontal plane extends perpendicularly to the drawing sheet of FIG. 1. Unbalance signals from the sensors 6, 6' are evaluated in a conventional manner in an evaluation unit 32, which preferably includes a signal processing computer, a memory for storing a control program, a keyboard for open loop control inputs, and a display for providing balancing information to an operator. Rotor-synchronous impulses received by an angle position sensor 7 are also processed to provide balancing information regarding the size and angular position of compensation masses for the respective balance planes required for balancing the wheel unit 3. As can be seen in FIG. 2, the compensation masses can be attached, for example, to the rim flange of the vehicle wheel as lead weights 31.

As shown in FIG. 1, the apparatus further comprises a loading device 10 that is arranged on the machine frame 5. The loading device 10 includes the above mentioned roller shoe 20 for applying a load to a tire tread surface 11A of a tire 11, perpendicular to the balancing spindle axis W. The roller shoe 20 includes a roller frame 12 carrying a plurality of roller 13 mounted for rotation in the roller shoe 20 for applying the load. The roller shoe 20 is suspended in the direction of vertical loading from a support arm which is also a load application arm 16 secured to a frame 10A of the loading mechanism 10. The load or force generated, for example, by a spindle S driven by a spindle drive SD is transmitted to the roller shoe 20 through a spring 14 and a damper or dashpot 15 arranged parallel to the spring 14 to form a shock absorber which is operatively interposed between the support arm 16 and the roller frame 12. The spring rate of the spring 14 and the damping property of the dashpot 15 forming a shock absorber for the roller shoe 20 are selected according to the invention to correspond essentially to the spring rate and damping property of a vehicle wheel suspension. The support arm 16 is guided by a guide G in the vertical direction of loading relative to the frame 10A as the arm is driven by the spindle S or by a piston cylinder drive or the like. The guide G is for example a prism guide or a dovetail guide. The arm 16 however, is locked into a fixed position when measurements are being taken. The roller shoe 20 is movable relative to the frame 10A by means of a low-friction bearing 17 for example in the form of a roller bearing, or a ball bearing, or a ball box for guiding the roller shoe 20.

As best seen in FIGS. 2 and 3, the roller shoe 20 has five rollers 13. The rotational axes RA of all rollers 13 extend in parallel to each other and in a common plane. Depending on the requirements for individual tire types, a different number of rollers can be provided. The common plane of the rotational roller axes extends parallel to the balancing spindle axis W and perpendicular to the direction of loading. In the first embodiment of FIGS. 1, 2 and 3, the roller shoe 20 is so aligned that the axes RA of the rollers 13 extend in parallel to the balancing spindle axis W for simulating travel of the vehicle along a straight road. The roller frame 20 is pivotable about an axis of the measuring direction, so that the plane formed by the axes of the rollers can be arranged at an angle to the axis balancing spindle W. The inertia mass of the roller shoe 20 is selected to correspond essentially to the inertia mass of the unsprung mass of the wheel unit 3 plus the unsprung components of the wheel assembly (hub, brake, wheel carrier), whereby an optimal simulation of the operating conditions of the vehicle as applied to the wheel unit 3 is assured.

FIG. 3 shows a plan view of the construction details of the present roller shoe 20. The rollers 13 have sections of greater diameter D and sections of smaller diameter d spaced along their axes. The axial lengths of the sections of greater and smaller diameter D, d are approximately equal. For reasons of simplifying the illustration, the rollers 13' have only four large diameter sections D and three smaller diameter sections d. The rollers 13" have three large diameter sections D and therebetween two small diameter sections d. However, rollers having more or fewer large diameter and small diameter sections can be provided. The tread width 30 of the tire 11 is indicated by dashed lines in FIG. 3.

The plan view of the roller shoe 20 in FIG. 3 shows that roller sections of larger diameter D of one roller 13' are paired with sections of smaller d of a neighboring roller 13", so that the center-to-center distance between the axes of two neighboring rollers is equal to D/2+d/2+S, wherein S is a space between the outer circumferential surfaces of two neighboring rollers just sufficient to assure, a contact-free arrangement of the neighboring rollers 13', 13" in the frame 12 of the roller shoe 20. The resulting arrangement of rollers 13 is thus very compact but permits the use of rollers of optimally large diameter within the tire roller contact surface area, thereby providing the greatest possible area of contact between the roller sections are the tire tread surface 11A of the tire 11. In this way, forces applied to the tread surface 11A or rather to the tire roller contact surface are effective at many closely spaced locations in a single plane, thereby providing optimal simulation of the footprint area of a tire on a road surface.

At least one of the rollers 13 of the roller shoe 20 has such a reduced rotational mass that the total reduced mass $m1_{dw}$ of the roller shoe 20 corresponds substantially to the reduced mass $m2_{dR}$ of the wheel unit 3 including corresponding rotating parts such as the wheel hub and the brake disc. It has been found that the actual vehicle operating conditions can be simulated quite well if this condition is satisfied. For example, if only one roller 13 is provided with a greater rotational mass than the other rollers in the roller shoe 20, then the combined rotational masses of all the rollers 13 of the roller shoe 20 are taken into account for ascertaining that the above condition is satisfied. This condition must even be satisfied if the roller shoe carries only a single roller.

The term "reduced mass" as used herein has reference to the rotational mass inertial moments of the rollers 13 and of the wheel unit 3. It is assumed that the respective "reduced" masses $m1_{dw}$ and $m2_{dR}$ are concentrated or effective at a point of a respective radius $d_w$ and $d_R$ as shown in FIG. 1. The mass moment of inertial $J_w$ of the roller or rollers 13 is then $$J_w = d_W^2 \cdot m1_{dw}.$$

$m1_{dw}$. The mass moment of inertia $J_R$ of the wheel unit 3 is then $$J_t = d_R^2 \cdot m2_{dR}.$$

The above condition namely that $m1_{dw} = m2_{dR}$ is satisfied if $$\frac{J_W}{d_W^2} = \frac{J_R}{d_R^2}.$$

If this condition is satisfied, the dynamic rotational acceleration characteristics of the system with the rollers 13 are equivalent to the dynamic rotational acceleration characteristics of the wheel unit 3, whereby the actual vehicle operating condition are most closely simulated by the present system.

As can be seen in FIG. 3, for example, three rollers 13' of the five rollers 13 have a greater rotational mass than the two other rollers 13" of the five rollers 13. Such a greater rotational mass is achieved by mass sections, for example in the form of disks 18 mounted to an end of the axles of the rollers 13' for rotation with the rollers 13. The mass of all rollers 13 plus the mass of the disks 18 is so selected that the overall mass moment of inertia and hence the reduced rotational mass $m1_{dw}$ of all rollers 13 and disks 18 effective at the radius $d_w$ of the rollers corresponds substantially to the reduced rotational mass $m2_{dR}$ of the wheel unit 3 that is effective at the tread radius $d_R$. The term "substantially" as used in this context is satisfied if the difference between the two rotational masses is limited to a range of ±20% of $m1_{dw}$ to $m2_{dR}$ or vice versa.

As seen in FIG. 3, the disks 18 of the two outer rollers 13' shown in the roller shoe 20 are located at inner axle ends of the roller 13' facing toward the measuring unit 1 or frame 10A. The disk 18 of the middle roller 13' is mounted on an outer axle end of the roller thereby facing away from the measuring unit 1. IT is also course possible to have an arrangement that is the reverse of the one shown in FIG. 3, namely one disk 18 facing inwardly and two disks 18 facing outwardly. In both instances, the diameter of the disks 18 for achieving the required mass moment of inertia can be selected to be as large as possible within the limits of the machine dimensions. The disks 18 that provide the required mass moment of inertia can also be arranged so that they are axially offset from each other, thereby providing space for even larger diameters of the disks 18.

The method for reducing vibrations caused by the wheel units 3 of a vehicle is preformed as follows. The wheel unit 3 is mounted on the balancing spindle 2 of the measuring unit 1. The motor 4 brings the wheel unit 3 up to a critical speed, i.e. an r.p.m. at which disturbing vibrations become noticeable. This speed is generally in the range of approximately 800 r.p.m., which corresponds to a driving speed of approximately 90 to 100 km/h. Other speeds or ranges of speeds can be studied at which critical vibrations occur or are expected to occur.

The roller shoe 20 of the loading mechanism 10 is brought from an idle position in which the rollers 13 do not contact the tire tread, into the contact position shown in FIGS. 1 and 2. The degree to which the tire 11 flattens at the tread surface 11A is determined by a specified vehicle loading applied through the spindle S. The vehicle loading can be modified by changing the position of the support arm 16 for the spring 14 and the dashpot 15 by rotating the spindle S. It is also possible that the loading mechanism 10 applies a force or load to the wheel unit 3 before or during the acceleration phase of the wheel unit 3. Once contact has been made between the rollers 13, 13' and the tire tread of the wheel unit 3, all rollers 13, 13', 13" and the disks 18 rotate in the roller shoe 20 at a speed that is determined by the speed of the wheel unit 3. During rotation, the sensors 6, 6' measure the vibrations of the oscillating bridges and the angular position sensor 7 tracks the angular position of the wheel unit 3. The evaluation unit 32 receives vibration magnitude signals from the sensors 6, 6' and rotor-synchronous angular position signals from the angular position sensor 7. Based on this information the unit 32 calculates the size and angular position of a compensation mass or balancing weight 31 for each respective compensation plane of the wheel unit 3. The size of the mass and its angular position required for balancing are displayed on a screen of the display for an operator who then attaches a respective balancing weight 31 or weights to the wheel rim. The compensation masses or weights 31 decisively reduce vibrations during vehicle operation.

It is also possible to use the apparatus shown in FIGS. 1 and 2 for conventional non-load dynamic balancing of a vehicle wheel unit by not activating the loading mechanism 10. It must be emphasized that it is particularly advantageous that both measurements, i.e., the non-load dynamic balancing and the balancing with a load application, are evaluated on the same measuring unit 1 by the same evaluation unit 32 in the same manner and during the same mounting of the wheel unit.

Furthermore, it is possible to maintain the contact force of the loading mechanism 10 substantially constant and to determine the radial run-out of the wheel unit 3 during rotation under load conditions that simulate actual vehicle operating conditions by measuring the displacements X of the roller shoe 20 relative to the loading mechanism frame 10A and, thus, relative to the axis W of the balancing spindle 2. The reverse is also possible, i.e., it is possible to lock the roller shoe 20 into position and to determine the oscillations of respective reaction forces.

Another advantage of the invention is seen in that the loading force exerted by the roller shoe 20 and the motions of the roller shoe 20 can be controlled by a program stored in a memory of the evaluation unit 32 which would thus also be a control unit. Such a program would simulate, for example, the conditions of a length of road on which the vehicle is traveling. As the program controlled load varies, the shoe 20 moves up and down and such motions are evaluated. The load application can, for example, be controlled through an electric spindle motor that operates the spindle drive DR or is part of the spindle drive. Moving the arm 16 up reduces the load, moving the arm 16 down increases the load.

In FIGS. 1 and 2 the rotational axes of the rollers 13 are extending in parallel to the rotational axis W of the balancing spindle 2 for simulating travel on a straight flat road condition.

Figure 4:
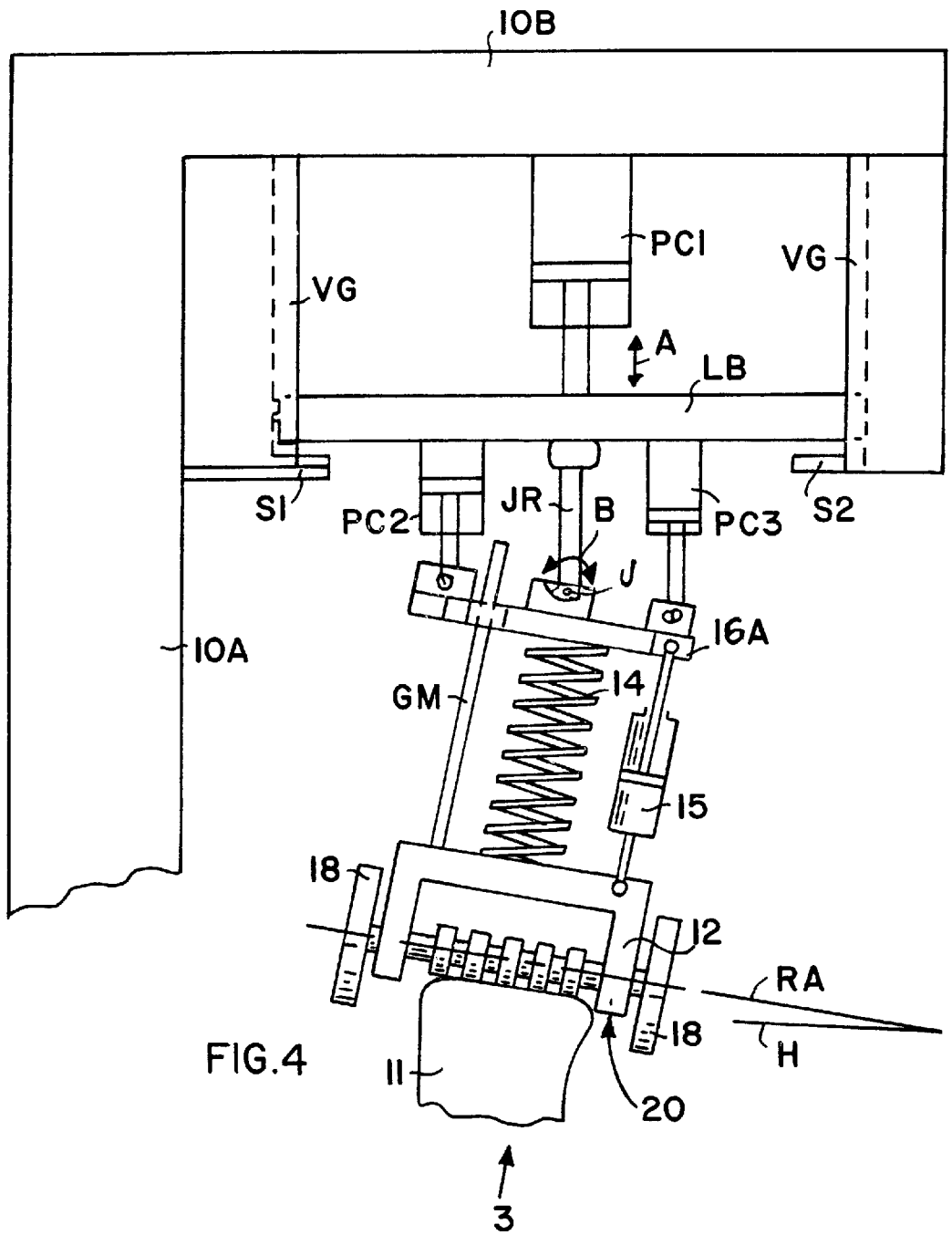
FIG. 4 is a view, partly broken away, similar to that of FIG. 1 showing a modified load application device for simulating actual vehicle operating conditions on a curved road.

In FIG. 4 the rotational axes RA of the rollers 13 can assume angular positions relative to the horizontal H and thus relative to the axis W of the balancing spindle 2. For this purpose the loading mechanism 10 is mounted to a cantilever arm 10B of the loading frame 10A. A loading beam LB is guided for vertical up and down movement by vertical guides VG such as tongue and groove guides or dovetail guides or the like. The spindle S has been replaced by a piston cylinder device PC1 preferably rigidly attached to the cantilever arm 10B for moving the load beam LB up and down as indicated by the arrow A. Stops S1, S2 limit the downward movement. The spindle S may, however, be used instead of the piston cylinder device PC1.

The load application frame 16A is tiltably mounted to the load beam LB by second and third piston cylinder devices PC2 and PC3 and by a journal rod JR and a journal J. When PC2 pulls up and PC3 pushes down, as shown in FIG. 4, the frame 16A tilts clockwise about the axis of the journal J. When PC2 pushes down and PC3 pulls up the frame 16A tilts counterclockwise. An arrow B symbolizes these motions. A single piston cylinder device or spindle could replace PC2 and PC3. Guidance and strength requirements will determine which elements to use in any particular machine. At least one guide member GM between the load application frame 16A and roller shoe 20 prevents canting between the frame 16A and the shoe 20 but permits the force transmission through the spring 14 and the damper 15. For this purpose and guide member GM passes slidably through the frame 16A.

The orientation of the spindle 2 with its axis W can either be horizontal as shown in FIGS. 1 and 4 or these Figs. are rotated by 90° counterclockwise for a vertical orientation of the spindle 2. The housing 5 and the frame 10A may be provided with legs resting on the ground for a vertical spindle orientation. The housing 5 and the frame 10A may alternatively rest directly on the ground for a vertical spindle orientation. In that case the belt drive 4A would be enclosed in the housing 5.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for reducing undesired vibrations generated by a vehicle wheel unit including a tire mounted on a wheel rim, said method comprising the following steps:
    a) mounting said wheel unit to a wheel mounting of a measuring unit for rotating said wheel unit;
    b) rotating said wheel unit about a wheel unit axis (W) at an r.p.m. within a vehicle operation r.p.m. range;
    c) simulating actual vehicle operating conditions by loading said rotating wheel unit through a loading device including a shock absorber having a spring dampling characteristic corresponding substantially to a spring damping characteristic of a vehicle wheel suspension;
    d) measuring vibration values and respective angular values while said wheel unit is rotating under said loading; and
    e) processing said vibration values and said angular values for providing information and obtaining a compensating mass to reduce said undesired vibrations.

2. The method of claim 1, further comprising providing vehicle specific information representing said actual vehicle operating conditions and controlling said loading step in response to said vehicle specific information so that a respective loading force applied to said wheel unit simulates said actual vehicle operating conditions.

3. The method of claim 1, further controlling said loading step so that a loading force is zero.

4. The method of claim 1, further comprising selecting for said loading device an inertia mass corresponding to an unsprung mass of said wheel unit including an unsprung mass of wheel mounting elements.

5. The method of claim 1, further comprising performing said loading step by distributing a loading force as a pressure force over a tire tread surface area.

6. The method of claim 5, further comprising deforming said tire tread surface area into a flat plane surface by said pressure force during loading.

7. The method of claim 1, further comprising selecting a reduced rotational inertia mass ($m1_{dw}$) of said loading device to correspond substantially to a reduced rotational inertial mass ($m2_{dR}$) of said vehicle wheel unit.

8. The method as described in claim 1, further comprising holding substantially constant a loading force during said loading step, performing said measuring step by sensing displacements of said loading device relative to said wheel unit axis (W), and evaluating said displacements in said processing step.

9. The method of claim 1, further comprising locking during said loading step said loading device in a load applying position relative to said wheel unit axis (W), performing said measuring step by sensing reaction forces effective on said vehicle wheel unit, and evaluating said reaction forces in said processing step.

10. The method of claim 6, wherein said flat plane surface extends in parallel to said wheel unit axis (W).

11. The method of claim 6, wherein said flat plane surface extends at an angle relative to said wheel unit axis.

12. An apparatus for reducing vibrations generated by a vehicle wheel unit including a tire mounted on a wheel rim, said apparatus comprising:
    a) a balancing machine (1) including a machine frame, a wheel mounting secured to said machine frame for holding said vehicle wheel unit (3), said wheel mounting having a rotation axis (W);
    b) a drive supported by said machine frame for rotating said vehicle wheel unit;
    c) a loading device (10) mounted to said machine frame for applying a load to said vehicle wheel unit, said loading device comprising a shock absorber including a spring (14) and damping element (15) cooperating with said spring (14) for applying said load against a tread of said tire, said spring and damping elements (14, 15) having a spring damping characteristic corresponding substantially to a spring damping characteristic of a vehicle wheel suspension for simulating actual vehicle operation conditions; and
    d) sensors (6, 6', 7) mounted in said balancing machine relative to said vehicle wheel unit for measuring vibration values and respective angular values of said vehicle wheel unit to provide information for obtaining a compensating mass to reduce said undesired vibrations.

13. The apparatus of claim 12, wherein said loading device comprises at least one roller.

14. The apparatus of claim 13, wherein said loading device comprises a roller shoe (20) including a frame (12) in which a plurality of rollers (13) is rotatably mounted, each roller of said plurality of rollers (13) having a roller axis (RA) extending in parallel to said rotation axis (W) of said wheel mounting.

15. The apparatus of claim 13, wherein said loading device comprises a roller shoe (20) including a frame (12) in which a plurality of rollers is rotatably mounted, each roller (13) having a roller axis (RA), and positioning elements (PC2, PC#) for tilting said roller frame so that said roller axes (RA) extend at the angle to said rotation axis (W) of said wheel mounting.

16. The apparatus of claim 13, further comprising a roller frame (12) in which a plurality of rollers is rotatably mounted, wherein each of said rollers comprises roller sections of small diameter (d) and roller sections of large diameter (D), larger than said small diameter, positioned between small diameter roller sections, and wherein said rollers are mounted in said roller frame with such axial spacings between neighboring rollers that said large diameter roller sections of one roller intermesh with small diameter roller sections of a neighboring roller and vice versa.

17. The apparatus of claim 16, wherein said large diameter roller sections comprise anti-friction bearings rotatably mounted on said rollers, so that an outer race of each said anti-friction bearing forms a large diameter roller section.

18. The apparatus of claim 13, further comprising at least one roller attachment member (18) attached to said at least one roller, said at least one roller attachment member (18) having a rotational mass moment of inertial larger than a rotational mass moment of inertia of said one roller, wherein said roller (13) including said roller attachment member (18) have a first reduced inertial mass ($m1_{dw}$) and said wheel unit (3) has a second reduced inertia mass ($m2_{dR}$), and wherein said first reduced inertia mass corresponds substantially to said second inertia mass $m1_{dw} \approx m2_{dR}$.

19. The apparatus of claim 18, wherein at least one said roller attachment member (18) is attached to an end of each of a plurality of rollers in such a way that said roller attachment members alternately face in opposite directions to avoid interference between neighboring roller attachment members.

20. The apparatus of claim 13, further comprising a roller frame (12), and wherein each of a plurality of rollers is mounted in said roller frame for rotation independently of any other roller in said roller frame.

21. The apparatus of claim 13, further comprising roller coupling means operatively interconnecting said rollers (13) of a plurality of rollers for synchronizing the rotation of said plurality of rollers (13).

22. The apparatus of claim 13, further comprising a separate drive for rotating at least one of a plurality of rollers.

23. The apparatus of claim 13, further comprising a drive for rotating all rollers of a plurality of rollers in synchronism.

24. The apparatus of claim 13, further comprising a roller frame (12) wherein a plurality of rollers are rotatably mounted to form a roller shoe comprising said roller frame and said plurality of rollers, and wherein said roller shoe has an inertia mass substantially corresponding to an unsprung mass of said wheel unit including an unsprung mass of wheel mounting elements.

25. The apparatus of claim 13, wherein said loading device (10) comprises a frame (10A), a frame extension (10B), a load application arm (16) guided by said frame, a force applying member (S; PC1) positioned between said frame extension (10B) and said load application arm (16) for moving said load application arm up or down, a roller shoe (20), at least one spring (14) and at least one damper (15) arranged in parallel to each other between said load application arm (16) and said roller shoe (20) and rollers (13) mounted in said roller shoe (20) for contacting said tire of said vehicle wheel unit, whereby a loading force is applied to wheel units through said spring (14) and damper (15).

26. The apparatus of claim 25, further comprising vertical guide means (17) for guiding said roller shoe (20) vertically up and down.

27. The apparatus of claim 13, further comprising means (PC2, PC3) for tilting said loading device relative to said wheel rotation axis (W).

28. The apparatus of claim 13, wherein said at least one roller has a reduced mass moment of inertia ($m1_{dw}$) corresponding substantially to a reduced mass moment of inertia ($m2_{dR}$) of said wheel unit (3).

29. The apparatus of claim 13, comprising a plurality of rollers having a total reduced mass moment of inertia ($m1_{dw}$) of all said rollers corresponding substantially to a reduced mass moment of inertia ($m2_{dR}$) of said wheel unit (3).

30. The apparatus of claim 12, wherein said rotation axis (W) of said wheel mounting is oriented vertically or horizontally.

* * * * *

UNITED STATES PATENT AND TRADEMARK OFFICE
CERTIFICATE OF CORRECTION

PATENT NO.     : 6,360,593 B1
DATED          : March 26, 2002
INVENTOR(S)    : Schoenfeld It is certified that error appears in the above-identified patent and that said Letters Patent is hereby corrected as shown below:

Title page,
ABSTRACT,
Line 2, after "a" replace "low pulsating" by -- compensating --;

Column 2,
Line 58, after "loading", replace "service" by -- device --;

Column 7,
Line 10, before "The", delete -- m1 $_{dw.}$ --;
Line 46, after "unit 1.", replace "IT" by -- It --;

Column 10,
Line 33, after "reducing", insert -- undesired --;

Column 11,
Line 3, after "PC2,", replace "PC#" by -- PC3 --.

Signed and Sealed this

Seventeenth Day of September, 2002

Attest:

Attesting Officer

JAMES E. ROGAN
*Director of the United States Patent and Trademark Office*